J. C. POTTER.
TURRET SLIDE MECHANISM FOR TURRET LATHES.
APPLICATION FILED JAN. 31, 1911.
1,140,479.
Patented May 25, 1915.
2 SHEETS—SHEET 2.
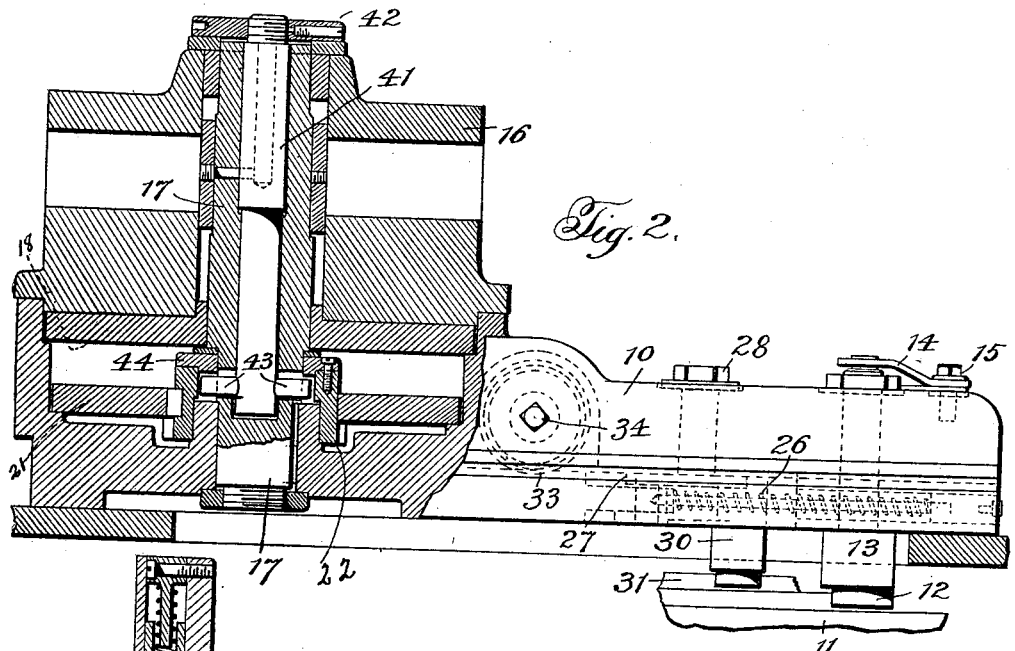
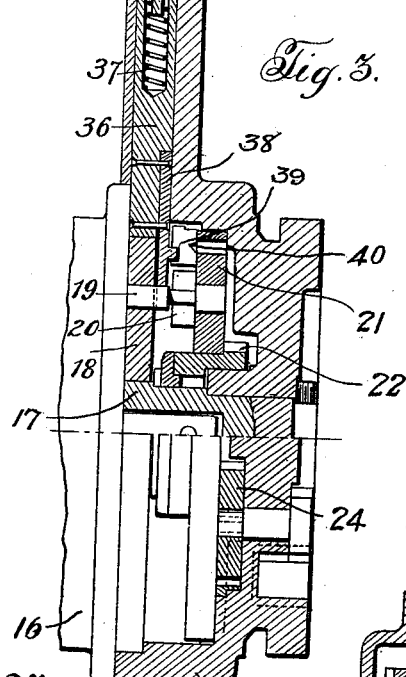
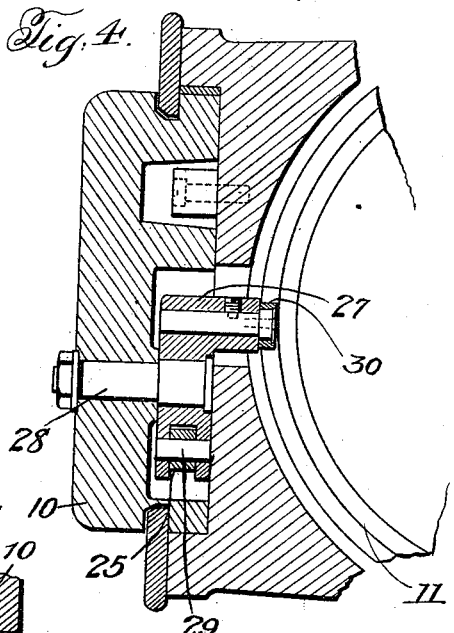
Witnesses:
Jas E Hutchinson
F. W. Ernst
Inventor:
James C. Potter,
By Chas J Williamson
Attorney

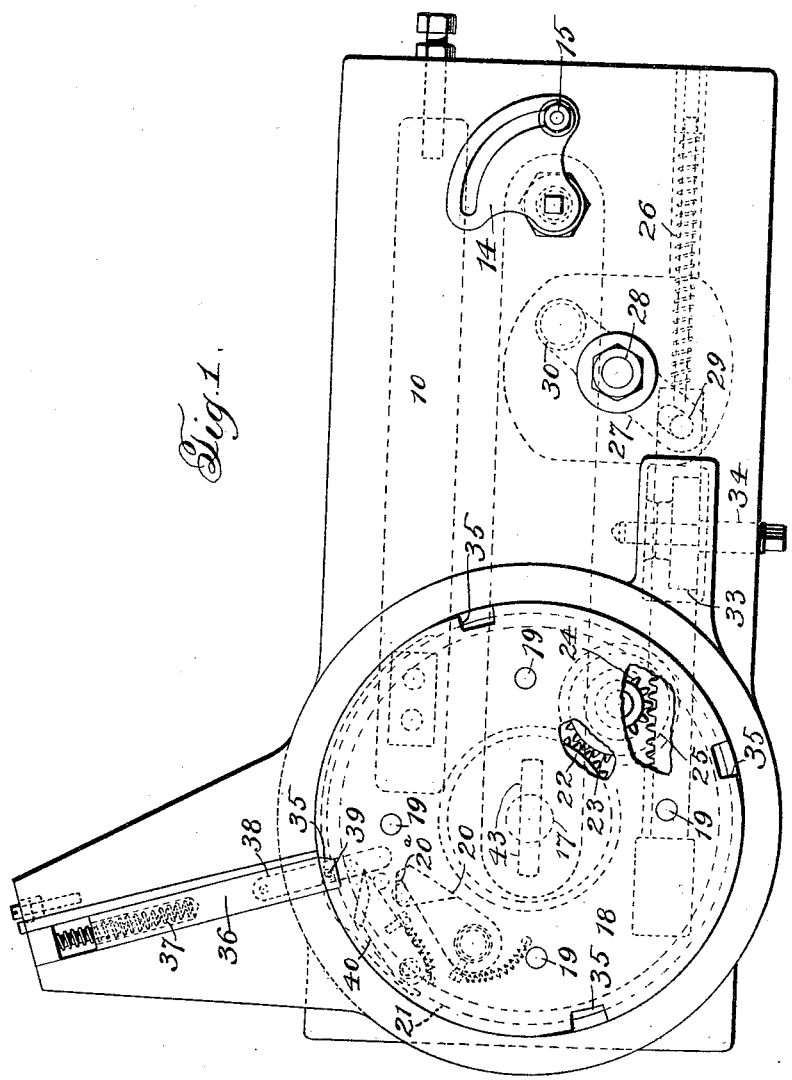

UNITED STATES PATENT OFFICE.

JAMES CHARLES POTTER, OF PROVIDENCE, RHODE ISLAND.

TURRET-SLIDE MECHANISM FOR TURRET-LATHES.

1,140,479.  Specification of Letters Patent.  Patented May 25, 1915.

Application filed January 31, 1911.  Serial No. 605,819.

*To all whom it may concern:*

Be it known that I, JAMES C. POTTER, of Providence, in the county of Providence, and in the State of Rhode Island, have invented a certain new and useful Improvement in Turret-Slide Mechanism for Turret-Lathes, and do hereby declare that the following is a full, clear, and exact description thereof.

The object of my invention is to provide improvements in the construction of the turret operating mechanism of automatic turret lathes to the end that the turret locking and rotating devices may be rendered simpler and more efficient in operation, and less liable to derangement, and to this end my invention consists in the turret mechanism constructed substantially as hereinafter specified and claimed.

In the accompanying drawings—Figure 1 is a top plan view of a turret slide embodying my invention, parts being shown broken away for the purpose of better illustration; Fig. 2 is a vertical longitudinal section thereof; Fig. 3 is a section on line 3—3 of Fig. 1; Fig. 4 a transverse section to one side of the turret illustrating in elevation a portion of the cam drum; and Fig. 5 a detail view in section showing the pinion and rack of the turret releasing mechanism.

The turret slide 10 is of ordinary form and longitudinally reciprocable by the action of a cam drum 11 grooved like the drum 14 of an application filed on even date herewith upon a roller 12 projecting from the bottom of the slide. The roller 12 is carried eccentrically on a stud 13, so that by the rotation of the stud, the roller 12 may be adjusted for proper engagement with its cam. The top of the stud shank is squared and is seated in a correspondingly shaped hole in a binding yoke 14 which is clamped by a screw 15 to the top of the turret slide.

The turret 16 is of usual form and is rotatably mounted upon a stud 17 which passes entirely through it, the stud being securely fastened at its lower end to the slide 10. To the bottom of the turret is fixed an index plate 18. This has a series of downwardly projecting equidistant pins 19 adapted to be engaged by a spring pressed feeding pawl 20 pivoted to an oscillatory pawl-carrier 21, also pivoted to the stud 17. The pawl-carrier 21 is fixed to the hub of a gear 22 journaled concentric with the stud 17, which gear 22 by means of intermediate gears 23 and 24 is adapted to be rotated by a rack bar 25 supported so as to be reciprocable longitudinally of the turret slide and which rack bar is moved in one direction by a coil spring 26 bearing at one end upon an end of the rack bar which being suitably mounted in the turret slide and the rack bar is movable in the other direction which is the direction to impart feeding movement to the pawl 20 by means of a lever 27 pivoted intermediate its end to a pivot stud or bolt 28 on the turret slide, one end of which lever engages a pin 29 on the rack bar 25, and the other end of which lever carries a stud or roller 30 which is acted upon by cam plates 31 on the periphery of the turret slide actuating drum 11. To enable the rack bar 25 to be moved by hand for the purpose of hand manipulation of the turret, said rack bar 32 has a second set of teeth with which mesh a pinion 33 on a shaft 34 having a square end projecting outside the turret slide for a suitable rotating crank arm.

The index plate 18 has as usual locking notches 35 one for each station of the turret with which coöperate a radially slidably locking bolt 36, said bolt being yieldingly pressed into locking engagement by means of a coil spring 37. Riveted to the underside of the locking bolt 36 is a bar 38 which projects inward beyond the notch-engaging end of the bolt 36 and on its underside has a pin or stud 39 in position to be engaged by the inclined free end of a bolt releasing spring held dog 40 pivoted to the pawl carrier 21, said dog, of course, being situated so that its cam end engages the stud 39 and moves the locking bolt 36 out of locking engagement before the end of the feed pawl 20 strikes a pin 19 to impart a turning movement to the turret. The bar 38 besides its function of carrying the releasing stud 39 performs the important function also of a safety device in the event that there is a failure of the releasing dog 40 to throw the bolt 36 out of locking engagement with the index plate. Under such conditions no outward movement of the locking bolt and its stud carrying bar 38 would occur. The inner end of the bar 39 is in position to be engaged by a cam surface 20$^a$ on the feeding pawl 20, as the feeding pawl moves onward in a feeding operation and swings or crowds the feeding pawl 20 sidewise so that its advancing end will not engage, but will clear the pin 19, which under normal conditions would be engaged by it and the rotating movement of the turret caused. Serious damage to the parts by reason of failure of the turret to be released is thus avoided.

As is usual I provide means for clamping and unclamping the turret. Said clamping means comprise a post or bolt 41 situated in a vertical cavity or chamber in the stud 17 and having at its upper end a nut 42 which through an interposed washer bears upon the top of the turret and at its lower end has a diametrically extending pin 42 that projects at opposite ends into an internal recess or chamber in the hub of the pinion 22, and lying beneath a ring or collar 44 secured to the top of the pinion hub and having on its underside at diametically opposite points two inclined teeth like surfaces 45 which by the rotation of the ring or collar 44 with the pinion 22 are movable into and out of engagement with said pin 43 so that under one condition by the action of said teeth on said pin, the post or bolt 41 is moved downward and a clamping effect produced upon the turret and under the other condition the clamping action is relieved. The nut 42 provides for such vertical adjustment of the post or bolt 41 as may be required to place the binding ring cams in proper relation with the pin 43.

The operation of my turret slide mechanism will be readily understood from the description which has already been given so that only a brief further description is necessary. Assuming the parts in the position shown in Fig. 1 upon the swing of the lever 27 by the action of the cam 31 on the roller 30 of said lever, the rack bar 25 will be moved against the pressure of its spring 26 and through the train of gearing connection the rack bar 25 and the pinion 22, the latter will be turned and as a first effect the inclined teeth or cams 45 of the clamping ring will be moved out of engagement with the pin 43 and thus the turret released from the clamp. Next the bolt releasing dog 40 will engage the stud 39 on the bar 38 of the locking bolt 36, and the locking bolt will be moved outward to disengage its inner end from one of its index plate notches, and by the time the release of the turret is thereby effected, the end of the feeding pawl 20 will be brought into engagement with one of the pins 19 and the continued turning of the pinion 22 will result in the revolution of the turret to the next station by which time the cam 31 will have passed out of engagement with the stud or roller 30 of the lever 27 and the spring 26 will act upon the rack bar 25 to move it in the reverse direction to return the unlocking and feeding pawls to their former position and to effect the clamping of the turret.

The cam plates 31 which act on the lever 27 to revolve the turret are distinct from the turret slide reciprocating cam groove in the drum 11, and by reason of this the revolution of the turret is accomplished after the turret slide has come to rest, the revolution of the cam drum continuing to effect the revolution of the turret, this being possible by the provision of a land or non-inclined portion of the groove of the cam drum 11 which engages the roller 12 of the turret slide. Heretofore the revolution of the turret has been accomplished during the completion of the rearward travel of the turret slide, and in practice the revolution of the turret began from two to four inches before the slide had reached the end of its outer travel. Under the old practice the working or piloting travel of the turret slide was reduced so that by my invention in the particular above set forth where the revolution of the turret takes place after the rearward or outer travel of the turret slide has ended, there is a substantial increase in the working or piloting travel of the slide.

Having thus described my invention what I claim is—

1. The combination of a turret slide, a turret, a turret lock, a lock releasing dog, a turret rotating pawl normally in turret rotating position, and automatic means to render said pawl inactive during a feeding movement on a failure of the turret to be unlocked consisting of a part lying in the path of the pawl in turret rotating movement, and operatively connected with the turret lock.

2. The combination of a turret slide, a turret, a locking bolt having a prolongation or extension, a bolt releasing dog, a feeding pawl in whose path said bolt prolongation lies when the bolt is in locking position.

3. The combination of a turret slide, a turret, a locking bolt having a prolongation or extension, a bolt releasing dog, a feeding pawl in whose path said bolt prolongation lies when the bolt is in locking position, and an oscillatory carrier for said dog and said pawl.

4. The combination of a turret slide, a turret, a stud rising from the slide on which the turret is pivoted, a clamping bolt contained in a chamber in said stud having a turret engaging head, a cam carrying ring pivoted upon said stud, and portions carried by said bolt adapted to be engaged by the cam of said ring, a gear to which said ring is attached, a locking bolt, a bolt releasing dog, a feed pawl, a carrier to which said pawl and dog are attached, said carrier being connected with said gear.

5. The combination of a turret slide, a turret, a locking bolt, bolt releasing means, turret rotating means, a carrier for said releasing and rotating means, a rack bar gearing between the rack bar and the carrier, a lever pivoted to the turret slide, connections between said lever and said rack bar, and a cam co-acting with said lever.

In testimony that I claim the foregoing I have hereunto set my hand.

JAMES CHARLES POTTER.

Witnesses:
　JOHN JOHNSTON,
　EARLES ROBERTS.

Copies of this patent may be obtained for five cents each, by addressing the "Commissioner of Patents, Washington, D. C."